(12) United States Patent
Abe

(10) Patent No.: US 12,731,325 B2
(45) Date of Patent: Sep. 8, 2026

(54) DISPLAY DEVICE, DISPLAY METHOD, AND NONTRANSITORY COMPUTER-READABLE MEDIUM

(71) Applicant: NEC Corporation, Tokyo (JP)

(72) Inventor: Jiro Abe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 121 days.

(21) Appl. No.: 18/695,466

(22) PCT Filed: Oct. 4, 2021

(86) PCT No.: PCT/JP2021/036688
§ 371 (c)(1),
(2) Date: Mar. 26, 2024

(87) PCT Pub. No.: WO2023/058098
PCT Pub. Date: Apr. 13, 2023

(65) Prior Publication Data

US 2024/0394958 A1 Nov. 28, 2024

(51) Int. Cl.
*G06T 15/10* (2011.01)
*G01S 17/86* (2020.01)
*G01S 17/894* (2020.01)

(52) U.S. Cl.
CPC .............. *G06T 15/10* (2013.01); *G01S 17/86* (2020.01); *G01S 17/894* (2020.01); *G06T 2210/56* (2013.01)

(58) Field of Classification Search
CPC ..... G06T 2210/56; G06T 19/00; G06T 15/10; G01S 17/894; G01S 17/86
See application file for complete search history.

(56) References Cited

U.S. PATENT DOCUMENTS

| | | | | |
|---|---|---|---|---|
| 10,977,861 | B1 * | 4/2021 | Rosen | B33Y 50/00 |
| 2006/0053455 | A1 * | 3/2006 | Mani | H04N 21/4305 375/E7.278 |
| 2016/0314589 | A1 * | 10/2016 | Nagao | G16H 30/20 |
| 2021/0127136 | A1 * | 4/2021 | Han | G06T 9/001 |

(Continued)

FOREIGN PATENT DOCUMENTS

| | | | |
|---|---|---|---|
| JP | 2011-170599 | A | 9/2011 |
| JP | 2016-205837 | A | 12/2016 |
| JP | 2018-088139 | A | 6/2018 |

(Continued)

OTHER PUBLICATIONS

International Search Report for PCT Application No. PCT/JP2021/036688, mailed on Nov. 16, 2021.

*Primary Examiner* — Phi Hoang
(74) *Attorney, Agent, or Firm* — Sughrue Mion, PLLC

(57) ABSTRACT

A display device and the like capable of displaying an entire measurement target and desired details are provided. A display device according to the present disclosure includes: a global display unit that displays a point cloud image generated using three-dimensional data including three-dimensional coordinate values of a measurement target; a position designation unit that designates a one-dimensional position in the three-dimensional data; and a local display unit that generates and displays a detailed image of the three-dimensional data based on the one-dimensional position designated by the position designation unit.

9 Claims, 13 Drawing Sheets

(56) References Cited

U.S. PATENT DOCUMENTS

| | | | | |
|---|---|---|---|---|
| 2021/0215805 | A1* | 7/2021 | Lever | G01S 17/894 |
| 2023/0342981 | A1* | 10/2023 | Kuma | G06T 7/60 |

FOREIGN PATENT DOCUMENTS

| | | | | |
|---|---|---|---|---|
| JP | 2018088139 | * | 6/2018 | G01B 11/24 |
| JP | 2019-137989 | A | 8/2019 | |
| JP | 2020-091590 | A | 6/2020 | |
| JP | 2021-143875 | A | 9/2021 | |
| WO | 2017/203792 | A1 | 11/2017 | |
| WO | 2021/044628 | A1 | 3/2021 | |

* cited by examiner

DISPLAY DEVICE, DISPLAY METHOD, AND NONTRANSITORY COMPUTER-READABLE MEDIUM

This application is a National Stage Entry of PCT/JP2021/036688 filed on Oct. 4, 2021, the contents of all of which are incorporated herein by reference, in their entirety.

TECHNICAL FIELD

The present disclosure relates to a display device, a display method, a program, and the like, and more particularly, to a display device, a display method, a program, and the like for displaying point cloud data measured by a sensor such as light detection and ranging (LiDAR).

BACKGROUND ART

A sensor such as LiDAR irradiates each measurement point of a measurement target with a laser and can calculate a distance to each measurement point based on a time from irradiation of the laser to reception of light. By using such a sensor while moving, a distance to a measurement target such as a water conduit or a tunnel and a shape thereof can be obtained.

For example, Patent Literature 1 discloses a three-dimensional data display device that displays three-dimensional data representing a facility such as a plant. The three-dimensional data display device can render the entire appearance of points of interest as the two-dimensional data by arranging the three-dimensional data and an avatar in a virtual space and moving the avatar by walking (walking through) or flying (flying through) in a facility represented by the three-dimensional data.

CITATION LIST

Patent Literature

Patent Literature 1: International Patent Publication No. WO 2017/203792

SUMMARY OF INVENTION

Technical Problem

However, when an entire elongated measurement target such as a water conduit or a tunnel is displayed, there is a problem that it is difficult to see an abnormal point or the like in the measurement target. On the other hand, when only details of the abnormal point are displayed, it is difficult to recognize at which position the abnormal point is in the entire elongated measurement target.

The present disclosure has been made to solve such a problem, and an object of the present disclosure is to provide a display device, a display method, a program, and the like capable of displaying an entire measurement target and desired details.

Solution to Problem

According to a first aspect of the present disclosure, a display device includes:

- a global display unit configured to display a point cloud image generated using three-dimensional data including three-dimensional coordinate values of a measurement target;
- a position designation unit configured to designate a one-dimensional position in the three-dimensional data; and
- a local display unit configured to generate and display a detailed image of the three-dimensional data based on the one-dimensional position designated by the position designation unit.

According to a second aspect of the present disclosure, a display method includes:

- displaying a point cloud image generated using three-dimensional data including three-dimensional coordinate values of a measurement target;
- designating a one-dimensional position in the three-dimensional data; and
- generating and displaying a detailed image of the three-dimensional data based on the designated one-dimensional position.

According to a third aspect of the present disclosure, a non-transitory computer-readable medium stores a program causing a computer to perform:

- a process of displaying a point cloud image generated using three-dimensional data including three-dimensional coordinate values of a measurement target;
- a process of designating a one-dimensional position in the three-dimensional data; and
- a process of generating and displaying a detailed image of the three-dimensional data based on the designated one-dimensional position.

Advantageous Effects of Invention

According to the present disclosure, it is possible to provide a display device, a display method, a program, and the like capable of displaying an entire measurement target and desired details.

EXAMPLE EMBODIMENT

Figure 1:
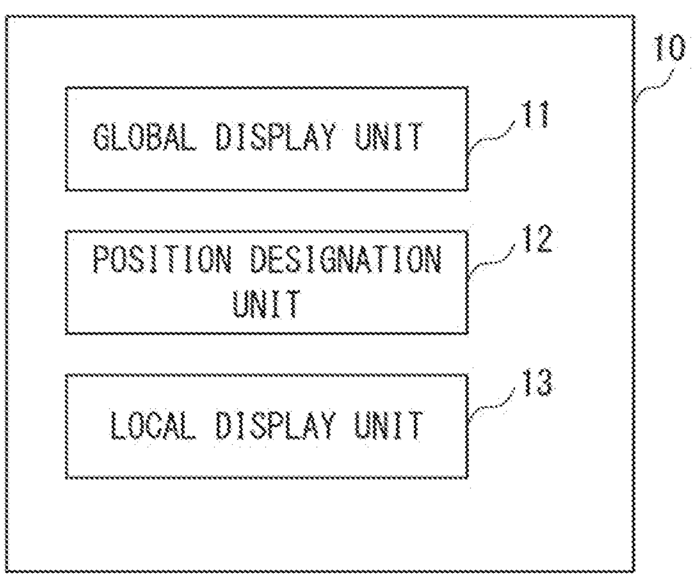
FIG. 1 is a block diagram illustrating a configuration of a display device according to a first example embodiment.

Example embodiments of the present disclosure will be described in detail below with reference to the drawings. In the drawings, the same or corresponding elements are denoted by the same reference numerals, and repeated description thereof will be omitted as necessary to clarify the description.

First Example Embodiment

FIG. 1 is a block diagram illustrating a configuration of an information processing device according to a first example embodiment.

The display device 100 is realized by a computer that includes a processor, a memory, and a graphical user interface (GUI). The display device 10 may be used to display a point cloud image generated using point cloud data from a sensor that measures a measurement target. The sensor may be a radar sensor (for example, light detection and ranging (LiDAR)) that measures the distance to the measurement point. Specifically, the display device 10 includes a global display unit 11, a position designation unit 12, and a local display unit 13.

The global display unit 11 graphically displays a point cloud image generated using three-dimensional data that includes three-dimensional coordinate values (coordinate values on the x axis, the y axis, and the z axis) of a measurement target. The global display unit 11 displays the entire generated point cloud image in at least a one-dimensional direction (for example, in the longitudinal direction, that is, in the x axis direction). The global display unit 11 may display the entire generated point cloud image in another one-dimensional direction (for example, in the z axis direction). The displayed point cloud image may be a two-dimensional image or a three-dimensional image.

The position designation unit 12 designates a specific one-dimensional position (for example, a coordinate value on the x axis) in the three-dimensional data. The position designation unit 12 can receive a user input (for example, a designation of a cursor position with a mouse, a touch input to a touch panel, or the like) and designate a position corresponding to the longitudinal direction (for example, in the x axis direction) in the three-dimensional data. In some example embodiments, the one-dimensional direction may correspond to a movement direction of a moving object on which a sensor measuring a measurement target is mounted.

The local display unit 13 generates and displays a detailed image in the three-dimensional data based on the one-dimensional position designated by the position designation unit. The local display unit 13 can generate and display local data (a detailed image) using three-dimensional data including three-dimensional coordinate values (coordinate values on the x axis, the y axis, and the z axis) of the measurement target and a designated one-dimensional position (for example, the coordinate value of the x axis). In some example embodiments, the local display unit 13 can display a three-dimensional point cloud image (for example, a perspective point cloud image including an abnormal point) within a predetermined range (for example, a range of a positive or negative threshold of the designated position coordinate value) in the one-dimensional direction from a designated position corresponding to the one-dimensional direction in the three-dimensional data. In another example embodiment, the local display unit 13 can display at least a two-dimensional image (for example, a cross-sectional view of the y axis and the z axis at a designated position coordinate value) at a designated position (for example, the coordinate value of the x axis) corresponding to the one-dimensional direction in the three-dimensional data.

Figure 2:
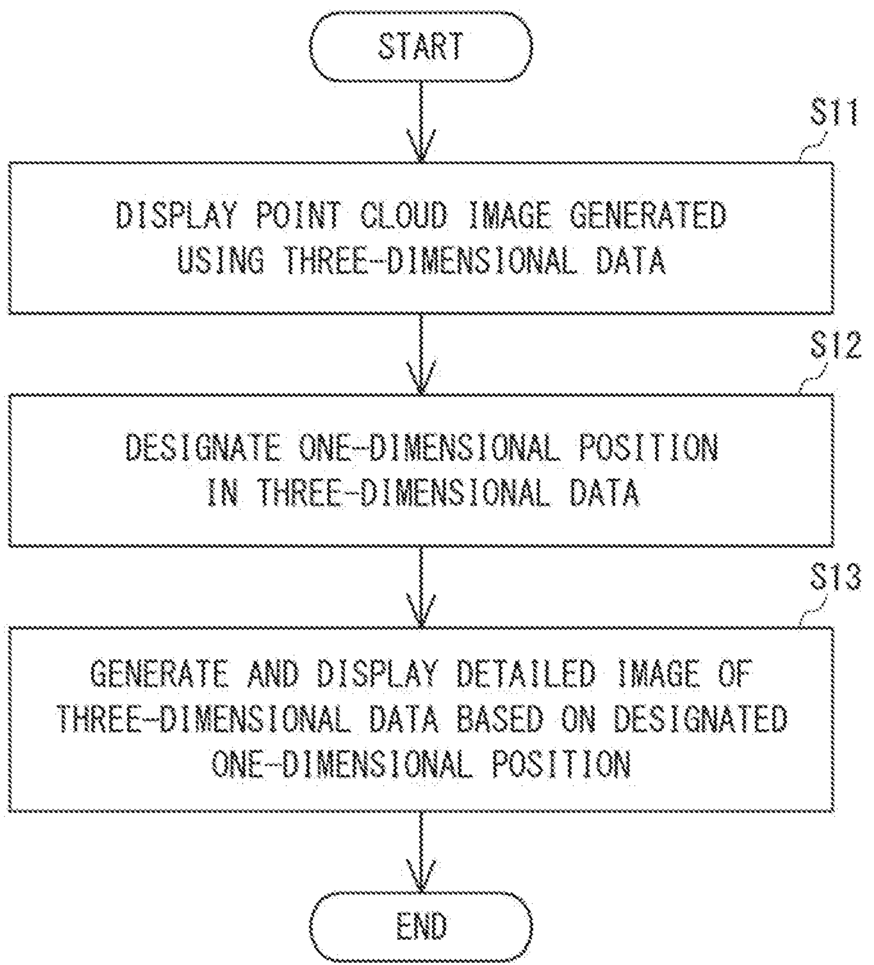
FIG. 2 is a flowchart illustrating a display method according to the first example embodiment.

FIG. 2 is a flowchart illustrating a display method according to the first example embodiment.

The global display unit 11 displays the point cloud image generated using the three-dimensional data including the three-dimensional coordinate values of the measurement target (step S11). The position designation unit 12 designates a one-dimensional position in the three-dimensional data (step S12). The local display unit 13 generates and displays a detailed image of the three-dimensional data based on the designated one-dimensional position (step S13). A program according to the present example embodiment is a program causing a computer to execute the display method as illustrated in FIG. 2.

The display device, the display method, and the program according to the above-described first example embodiment can simultaneously display the entire measurement target and desired details, and thus can provide the user with a GUI appropriate for inspection, analysis, or the like of an abnormal point or the like.

Second Example Embodiment

Figure 3:
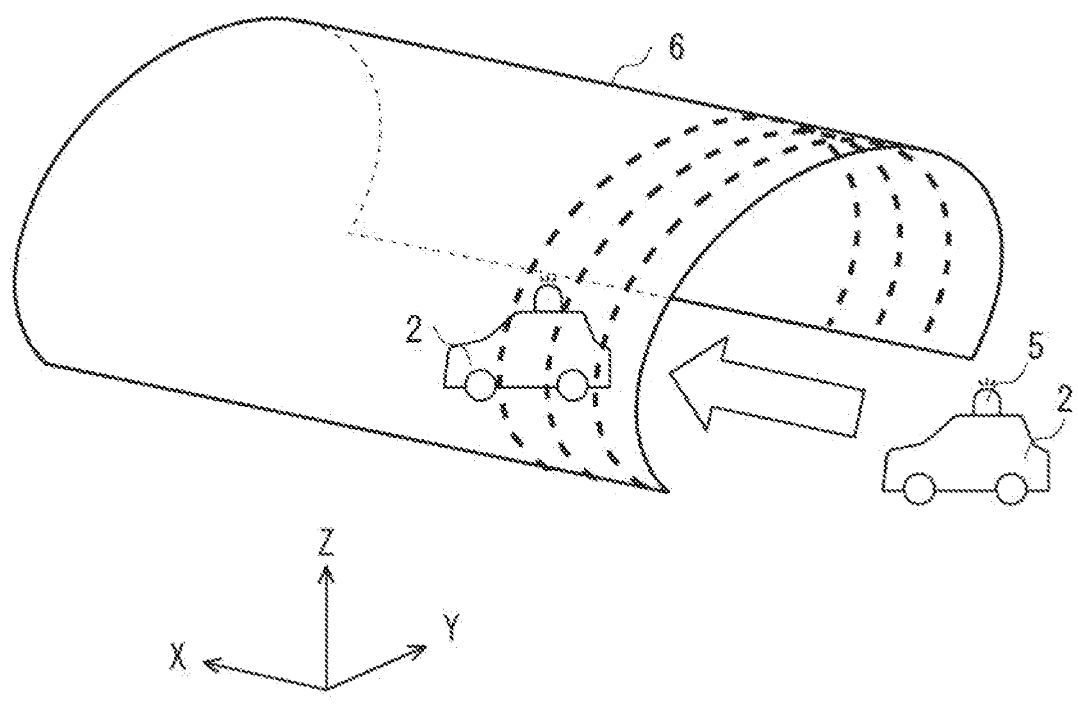
FIG. 3 is a diagram illustrating an example in which an inner wall of a tunnel is measured by a sensor mounted on a moving object according to a second example embodiment.

FIG. 3 is a diagram illustrating an example in which an abnormality in a water conduit is detected by a sensor according to a second example embodiment; In FIG. 3, while a moving object 2 (for example, a vehicle, a water surface drone, or the like) on which a sensor 5 (also referred to as a distance measurement sensor) which is a LiDAR is mounted travels in a water conduit (in a direction of an arrow in FIG. 3), an inner wall (measurement target 6) of the water conduit is irradiated with a laser from the sensor in various directions. Thereafter, the sensor receives reflected light of the laser from the measurement target. The sensor may emit the laser substantially continuously at a very short period. Alternatively, the moving object 2 may move to any position and emit the laser at each position. The sensor measures a distance to each measurement point based on a length of time from a time at which a large number of lasers are emitted in the circumferential direction to a time at which the reflected light is received. Alternatively, the sensor can acquire a luminance value of the reflected light, and thus can estimate a material (for example, a metal or textile) of the measurement target. In this way, the sensor 5 can acquire the point cloud data including the measurement data at the plurality of measurement points measured by the sensor 5. For example, the measurement data may include coordinate values on the x axis, the y axis, and the z axis at each measurement point. As illustrated, the water conduit has an elongated shape, and a length of the water conduit may be 50 m or more, 100 m or more, 300 m or more, 1 km or more, or the like.

In this example, an abnormal point such as the inner wall of the water conduit is detected based on the acquired point cloud data. For example, it can be determined from a difference in the distance measured by the sensor, that is, a shape of the abnormal point (for example, a recess, a hole, or a crack). The abnormal point can be detected using a known abnormal point detection program.

Figure 4:
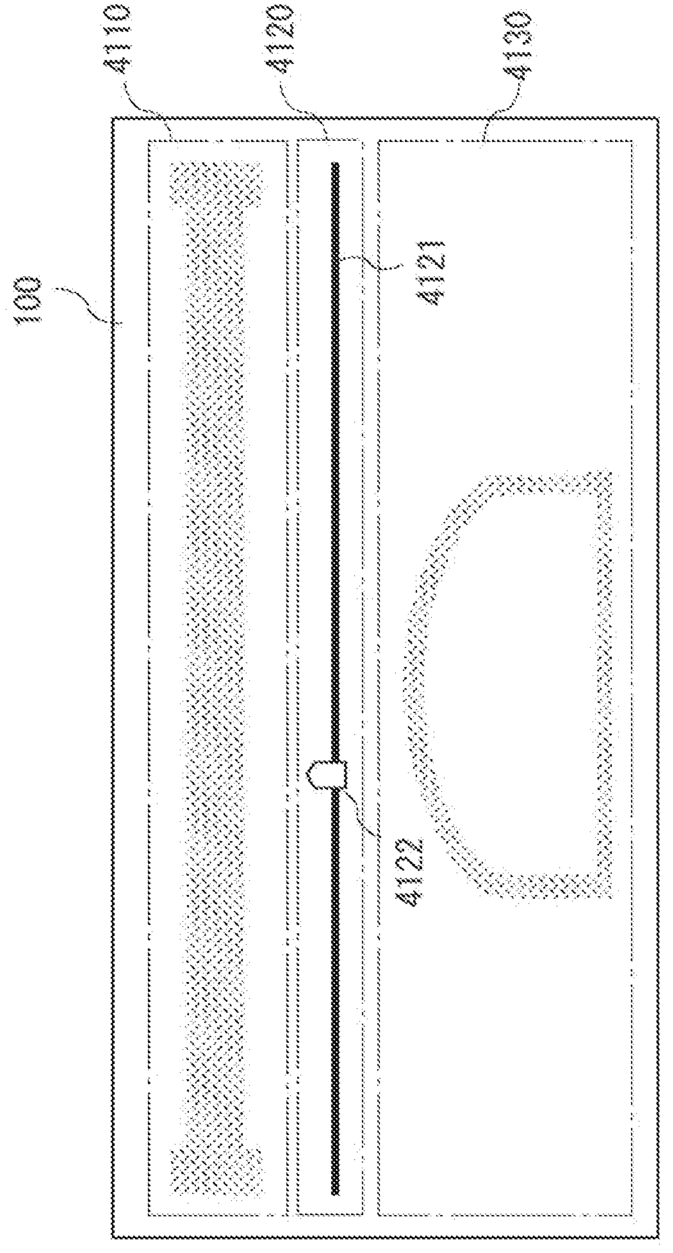
FIG. 4 is a diagram illustrating an example of a graphical user interface according to the second example embodiment.

FIG. 4 is a diagram illustrating an example of a graphical user interface according to the second example embodiment. The GUI can be used to display a point cloud image generated using the acquired three-dimensional data, and inspect or analyze an abnormal point. The GUI includes a global display region 4110, a one-dimensional position designation display region 4120, and a local display region 4130. In the global display region 4110, a point cloud image generated using the measured three-dimensional data is displayed. In the point cloud image, the entire one-dimensional direction (x axis direction) is displayed such that both ends of the measurement target in the longitudinal direction of the water conduit are displayed. In the global display region 4110 of FIG. 4, the entire point cloud image of the water conduit 6 viewed from above is displayed. The image shown in the global display region is merely exemplary and may be a side view or a bottom view. The displayed point cloud image may be a two-dimensional image or a three-dimensional image.

The one-dimensional position designation display region 4120 displays a slider bar 4121 that has a length corresponding to both ends in the longitudinal direction (x axis direction) of the point cloud image displayed in the global display region 4110. A slider 4122 can be moved along the slider bar 4121 by a designation input of the user. In some example embodiments, the one-dimensional position designation display region may be displayed to overlap with the global display region. In some example embodiments, the direction of the slider bar may correspond to the movement direction of the moving object 2 on which the sensor acquiring the point cloud data is mounted.

The local display region 4130 generates and displays a detailed image of the three-dimensional data of the measurement target based on the designated one-dimensional position. As illustrated in FIG. 4, in the detailed image, at least a two-dimensional image (for example, a cross-sectional view of the y axis and the z axis in a designated position coordinate value) at a designated position (for example, the coordinate value of the x axis) corresponding to the one-dimensional direction in the three-dimensional data is displayed. In another example embodiment, a three-dimensional point cloud image (for example, a perspective point cloud image including the abnormal point) within a predetermined range (for example, a range of a positive or negative threshold of the designated position coordinate value) in the one-dimensional direction from a designated position corresponding to the one-dimensional direction in the three-dimensional data can be displayed.

Figure 5:
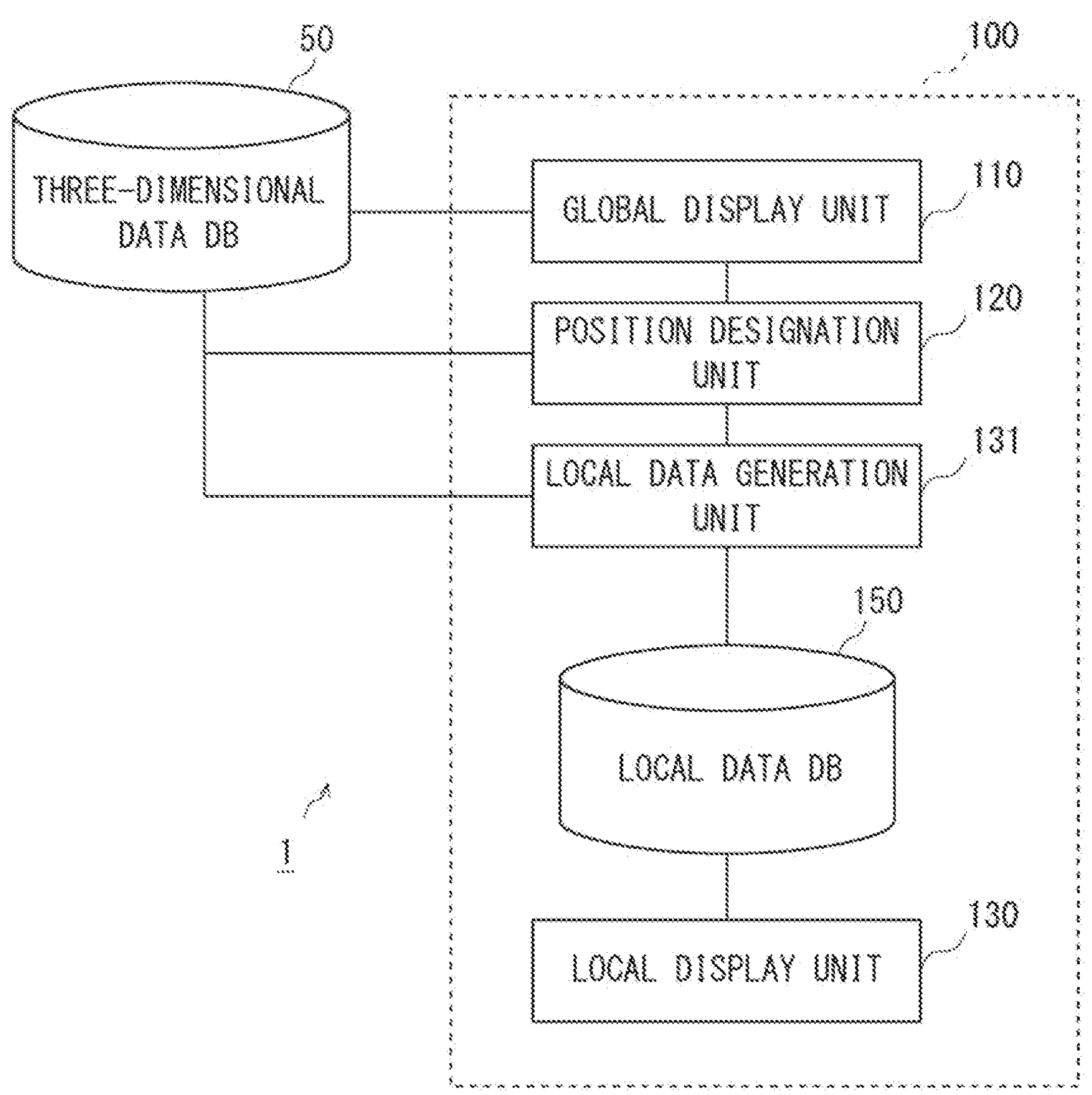
FIG. 5 is a block diagram illustrating a configuration of a display system according to the second example embodiment.

FIG. 5 is a block diagram illustrating a configuration of a display system according to the second example embodiment.

A display system 1 may include a three-dimensional data database 50 and a display device 100. The display device 100 may include a global display unit 110, a position designation unit 120, a local data generation unit 131, a local data database 150, and a local display unit 130. In some example embodiments, the display device 100 may include the three-dimensional data database 50.

The three-dimensional data database 50 stores the three-dimensional data acquired by the sensor 5 (for example, LiDAR) by moving the moving object 2 as described above. The three-dimensional data database 50 may store raw measurement data that can include coordinate values on the x axis, the y axis, and the z axis at each measurement point, or a point cloud image generated based on the measurement data.

The global display unit 110 displays the generated point cloud image using the three-dimensional data including the three-dimensional coordinate values (coordinate values on the x-axis, the y-axis, and the z-axis) of the measurement target. As illustrated in FIG. 4, the global display unit 110 displays at least the entire one-dimensional direction (for example, in the x axis direction) of the generated point cloud image. The displayed point cloud image may be a two-dimensional image or a three-dimensional image. In some example embodiments, the display device 100 may include a global data generation unit that generates a point cloud image (global data) based on the raw measurement data that can include coordinate values on the x axis, the y axis, and the z axis at each measurement point.

The position designation unit 120 determines a scale based on the coordinate value range of the three-dimensional data or a display shape of the global display unit. Here, the scale indicates a one-dimensional position (association) corresponding to the point cloud image displayed on the global display unit 110 based on, for example, a maximum value and a minimum value in the longitudinal direction in the three-dimensional data. In other words, the determination of the scale is to quantify the position of the slider bar to correspond to the point cloud image displayed on the global display unit 110. The position designation unit 120 designates a specific one-dimensional position (for example, a coordinate value on the x axis) in the three-dimensional data. The position designation unit 120 can receive a user input (for example, an input of a numerical value by a numeric keypad, a designation of a cursor position by a mouse, or a designation of a slider bar by a touch input to a touch panel) and designate a position corresponding to the longitudinal direction (for example, in the x axis direction) in the three-dimensional data.

The local data generation unit 131 generates a detailed image (local data) of the three-dimensional data based on the one-dimensional position designated by the position designation unit. The local data generation unit 131 can create local data (detailed image) using the three-dimensional data including the three-dimensional coordinate values (coordinate values on the x-axis, the y-axis, and the z-axis) of the measurement target and the designated one-dimensional position (for example, the coordinate value of the x axis). In some example embodiments, a three-dimensional point cloud image (for example, a perspective point cloud image including the abnormal point) within a predetermined range (for example, a range of a positive or negative threshold of the designated position coordinate value) in the one-dimensional direction from a designated position corresponding to the one-dimensional direction in the three-dimensional data can be generated. In another example embodiment, at least a two-dimensional image (for example, a cross-sectional view of the y axis and the z axis in the designated position coordinate value) at a designated position (for example, the coordinate value of the x axis) corresponding to the one-dimensional direction in the three-dimensional data can be generated. The generated image may be subjected to various types of processing such as coloring of the abnormal point in an easy-to-understand manner.

The local data database 150 stores the local data (detailed image data) generated by the local data generation unit 131. In some example embodiments, the local data database 150 may be provided outside of the display device 100 via a wired or wireless network.

The local display unit 130 displays the detailed image generated based on the one-dimensional position designated by the position designation unit 120. In some example embodiments, the local display unit 130 can display a three-dimensional point cloud image (for example, a perspective point cloud image including the abnormal point) within a predetermined range (for example, a range of a positive or negative threshold of the designated position coordinate value) in the one-dimensional direction from a designated position corresponding to the one-dimensional direction in the three-dimensional data. In another example embodiment, the local display unit 130 can display at least a two-dimensional image (for example, a cross-sectional view of the y axis and the z axis at a designated position coordinate value) at a designated position (for example, the coordinate value of the x axis) corresponding to the one-dimensional direction in the three-dimensional data. The image displayed on the local display unit 130 may be subjected to various types of processing such as coloring of the abnormal point in an easy-to-understand manner.

Figure 6:
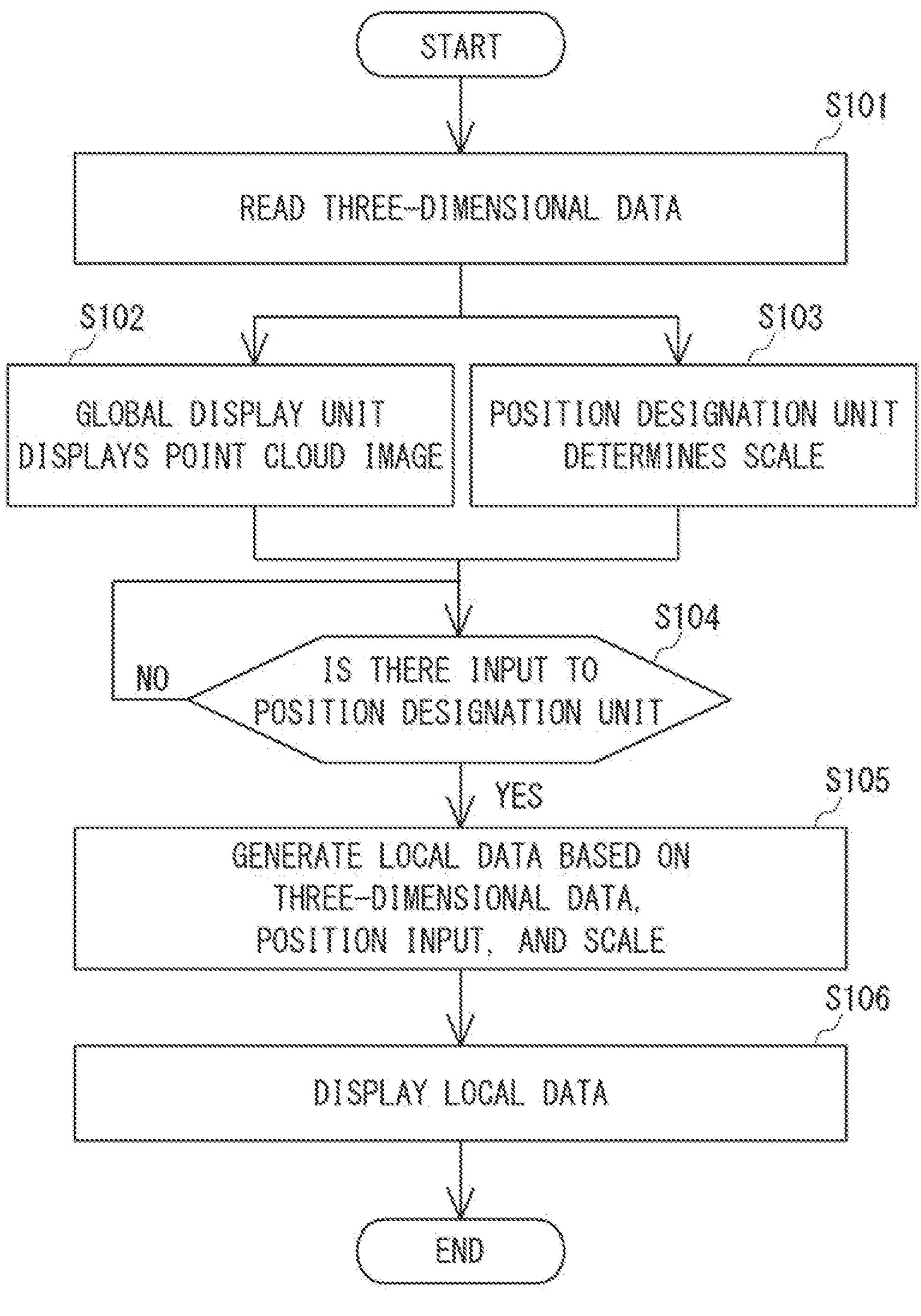
FIG. 6 is a flowchart illustrating a display method according to the second example embodiment.

FIG. 6 is a flowchart illustrating a display method according to the second example embodiment.

When the display device 100 reads the three-dimensional data from the three-dimensional data database 50 (step S101), the global display unit 110, the position designation unit 120, and the local data generation unit 131 then receive the three-dimensional data. The global display unit 110 displays the point cloud image generated using the three-dimensional data (step S102). The position designation unit 120 determines a scale based on the coordinate value range (the maximum value and the minimum value) of the three-dimensional data or the display shape of the point cloud image displayed on the global display unit 110, or the like (step S103). Steps S102 and S103 may be performed simultaneously, or either step S102 or S103 may be performed first.

Further, the position designation unit 120 receives a user input and designates a one-dimensional position (for example, the position of the slider bar in FIG. 4) (step S104). The user can select a portion where the user desires to display details from the slider bar 4120 that can correspond to the image displayed in the global display region 4110.

The local data generation unit 131 generates local data (detailed image data) based on the three-dimensional data, the one-dimensional position designated by the user input, and the above-described scale (step S105). The generated local data may be stored in the local data database 150. The local display unit 130 displays the generated the local data (detailed image data) (step S106). The local display unit 130 may acquire the local data corresponding to the designated one-dimensional position from the local data database 150 and display the local data. A program according to the present example embodiment is a program causing a computer to execute the display method as illustrated in FIG. 6.

The display device, the display method, and the program according to the above-described second example embodiment can simultaneously display an entire elongated measurement target and desired details, and can accordingly provide the user with a GUI appropriate for inspection, analysis, or the like of an abnormal point or the like.

Figure 7:
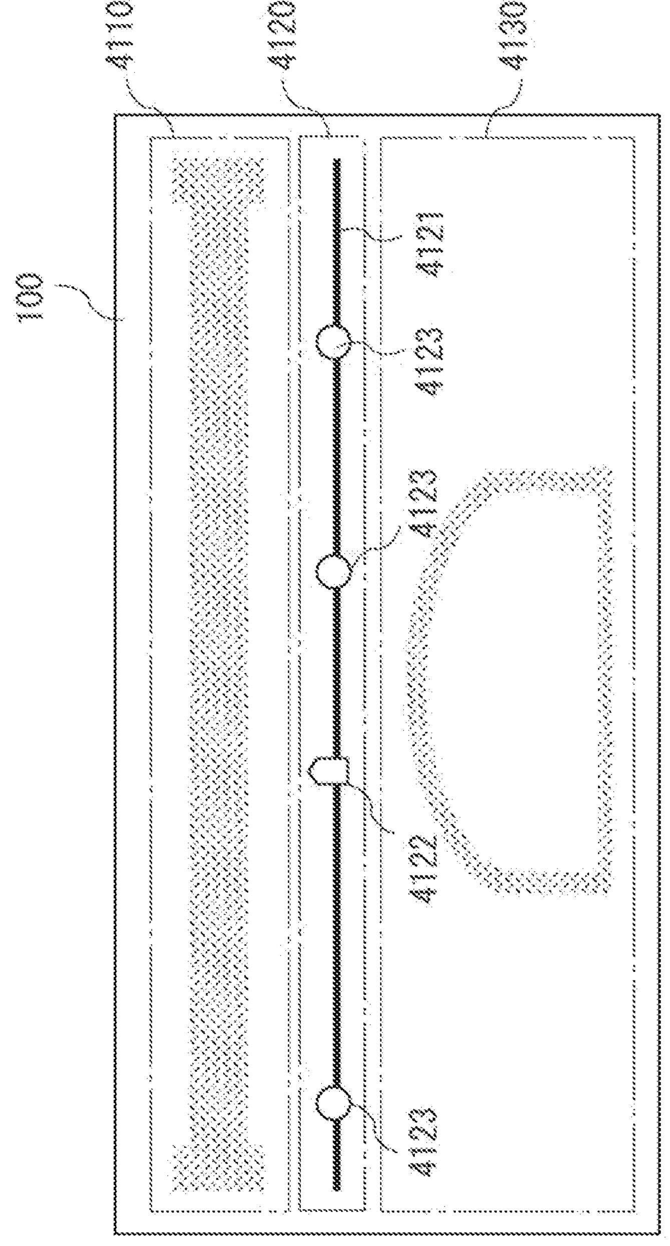
FIG. 7 is a diagram illustrating an example of a graphical user interface according to another example embodiment.

FIG. 7 is a diagram illustrating an example of a graphical user interface according to another example embodiment.

The GUI of FIG. 7 displays a point cloud image generated using the acquired three-dimensional data, and can be used to inspect or analyze an abnormal point. The GUI includes a global display region 4110, a one-dimensional position designation display region 4120, and a local display region 4130. In the global display region 4110, a point cloud image generated using the measured three-dimensional data is displayed. In the point cloud image, the entire one-dimensional direction (x axis direction) is displayed such that both ends of the measurement target in the longitudinal direction of the water conduit are displayed. In the global display region 4110 of FIG. 7, the entire point cloud image of the water conduit 6 viewed from above is displayed.

The one-dimensional position designation display region 4120 displays a slider bar 4121 that has a length corresponding to both ends in the longitudinal direction (x axis direction) of the point cloud image displayed in the global display region 4110. A slider 4122 can be moved along the slider bar 4121 by a designation input of the user. In the one-dimensional position designation display region 4120 in this example embodiment, one-dimensional positions 4123 indicating one or more abnormal points are displayed on the slider bar 4121. The abnormal point can be detected by executing a known abnormal point detection algorithm on the three-dimensional data. One-dimensional positions (three positions in the example of FIG. 7) of one or more abnormal points detected in this manner are displayed on the slider bar 4121 in advance. Thus, the user can easily display and check the detailed image of the abnormal point in the local display region 4130 by moving the slider to the abnormal point on the slider bar. In some example embodiments, the one-dimensional position designation display region may be displayed to overlap with the global display region.

The local display region 4130 generates and displays a detailed image of the three-dimensional data of the measurement target based on the designated one-dimensional position. As illustrated in FIG. 7, the detailed image displays at least a two-dimensional image (for example, a cross-sectional view of the y axis and the z axis in a designated position coordinate value) at a designated position (for example, the coordinate value of the x axis) corresponding to the one-dimensional direction in the three-dimensional data. In another example embodiment, a three-dimensional point cloud image (for example, a perspective point cloud image including the abnormal point) within a predetermined range (for example, a range of a positive or negative threshold of the designated position coordinate value) in the one-dimensional direction from a designated position corresponding to the one-dimensional direction in the three-dimensional data can be displayed.

Figure 8:
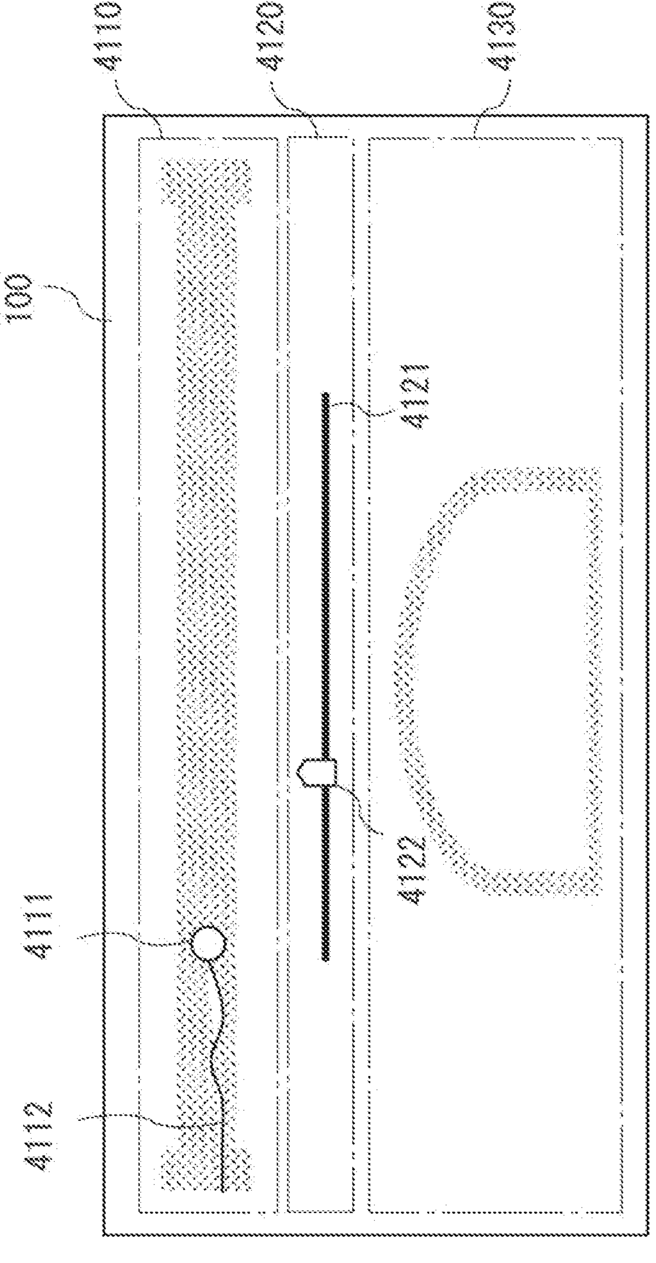
FIG. 8 is a diagram illustrating an example of a graphical user interface according to still another example embodiment.

FIG. 8 is a diagram illustrating an example of a graphical user interface according to still another example embodiment.

The GUI of FIG. 8 displays a point cloud image generated using the acquired three-dimensional data, and can be used to inspect or analyze an abnormal point. In the present example embodiment, time stamp information is used as the one-dimensional position. The time stamp information may include a time at which the measurement target is irradiated with a laser and measurement data is acquired while the moving object moves.

The GUI includes a global display region 4110, a one-dimensional position designation display region 4120, and a local display region 4130. In the global display region 4110, a point cloud image generated using the measured three-dimensional data is displayed. In the point cloud image, the entire one-dimensional direction (x axis direction) is displayed such that both ends of the measurement target in the longitudinal direction of the water conduit are displayed. In the global display region 4110 of FIG. 8, the entire point cloud image of the water conduit 6 viewed from above is displayed. In the global display region 4110, a current position 4111 of the moving object 2 at a time corresponding to the position of the slider 4122 on the slider bar 4121 of the one-dimensional position designation display region 4120 to be described below is displayed. A route 4112 toward the current position 4111 of the moving object 2 is also displayed.

The one-dimensional position designation display region 4120 displays the slider bar 4121 indicating a time at which the measurement target is irradiated with a laser beam and the measurement data is acquired while the moving object moves. The length of the slider bar 4121 according to the present example embodiment may not necessarily correspond to a horizontal width of the point cloud image displayed on the global display unit. A slider 4122 can be moved along the slider bar 4121 by a designation input of the user.

The local display region 4130 generates and displays a detailed image of the three-dimensional data of the measurement target based on the designated one-dimensional position (time stamp information). As illustrated in FIG. 8, in the detailed image, at least a two-dimensional image (for example, a cross-sectional view of the y axis and the z axis at an x coordinate value corresponding to time stamp information) at a designated position (time stamp information) corresponding to the one-dimensional direction in the three-dimensional data is displayed. In another example embodiment, a three-dimensional point cloud image (for example, a perspective point cloud image including the abnormal point) within a predetermined range (for example, the range of a positive or negative threshold of the x coordinate value corresponding to the time stamp information) in the one-dimensional direction from a designated position corresponding to the one-dimensional direction in the three-dimensional data can be displayed.

Third Example Embodiment

Figure 9:
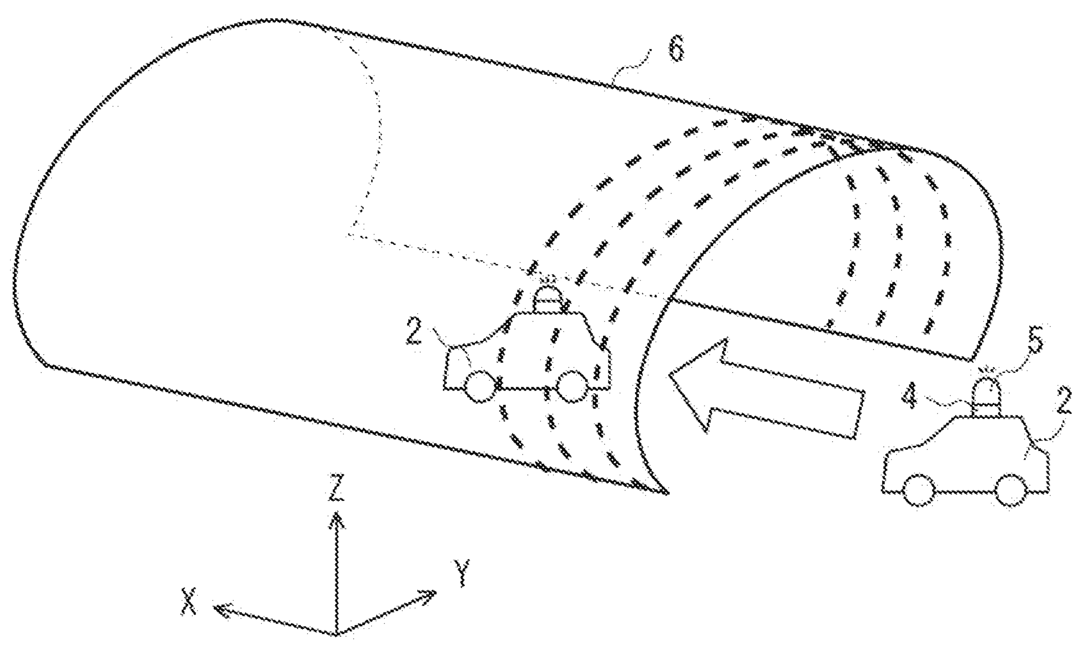
FIG. 9 is a diagram illustrating an example in which an inner wall of a tunnel is measured by a sensor and a camera mounted on a moving object according to a third example embodiment.

FIG. 9 is a diagram illustrating an example in which an abnormality in a water conduit is detected by a sensor and a camera according to a third example embodiment. In FIG. 9, while a moving object 2 (for example, a vehicle, a water surface drone, or the like) on which a sensor 5 which is a LiDAR and a camera 4 such as a video camera are mounted travels in a water conduit (in a direction indicated by an arrow in FIG. 9), a moving image is captured by the camera 4, and an inner wall of the water conduit (measurement target 6) is irradiated with a laser from the sensor 5. Each of the sensor 5 and the camera 4 can include time stamp information indicating an acquisition time. Thereafter, the sensor receives reflected light of the laser from the measurement target. The sensor may emit the laser substantially continuously at a very short period. Alternatively, the moving object 2 may move to any position and emit the laser at each position. The sensor measures a distance to each measurement point based on a length of time from a time at which a large number of lasers are emitted in the circumferential direction to a time at which the reflected light is received. Alternatively, the sensor can acquire a luminance value of the reflected light, and thus can estimate a material (for example, a metal or textile) of the measurement target. In this way, the sensor 5 can acquire the point cloud data including the measurement data at the plurality of measurement points measured by the sensor 5. For example, the measurement data may include coordinate values on the x axis, the y axis, and the z axis at each measurement point. As illustrated, the water conduit has an elongated shape, and a length of the water conduit may be 50 m or more, 100 m or more, 300 m or more, 1 km or more, or the like. The camera 4 may be a celestial sphere camera capable of performing imaging in all directions (360 degrees) of the moving object 2. Alternatively, the camera 4 may be a video camera or a still camera that performs imaging in a laser emission direction of the sensor 5 which is LiDAR.

In this example, an abnormal point such as the inner wall of the water conduit is detected based on the acquired point cloud data and a captured image of the camera. For example, it can be determined from a difference in the distance measured by the sensor, that is, a shape of the abnormal point (for example, a recess, a hole, or a crack). The abnormal point can be detected using a known abnormal point detection program.

Figure 10:
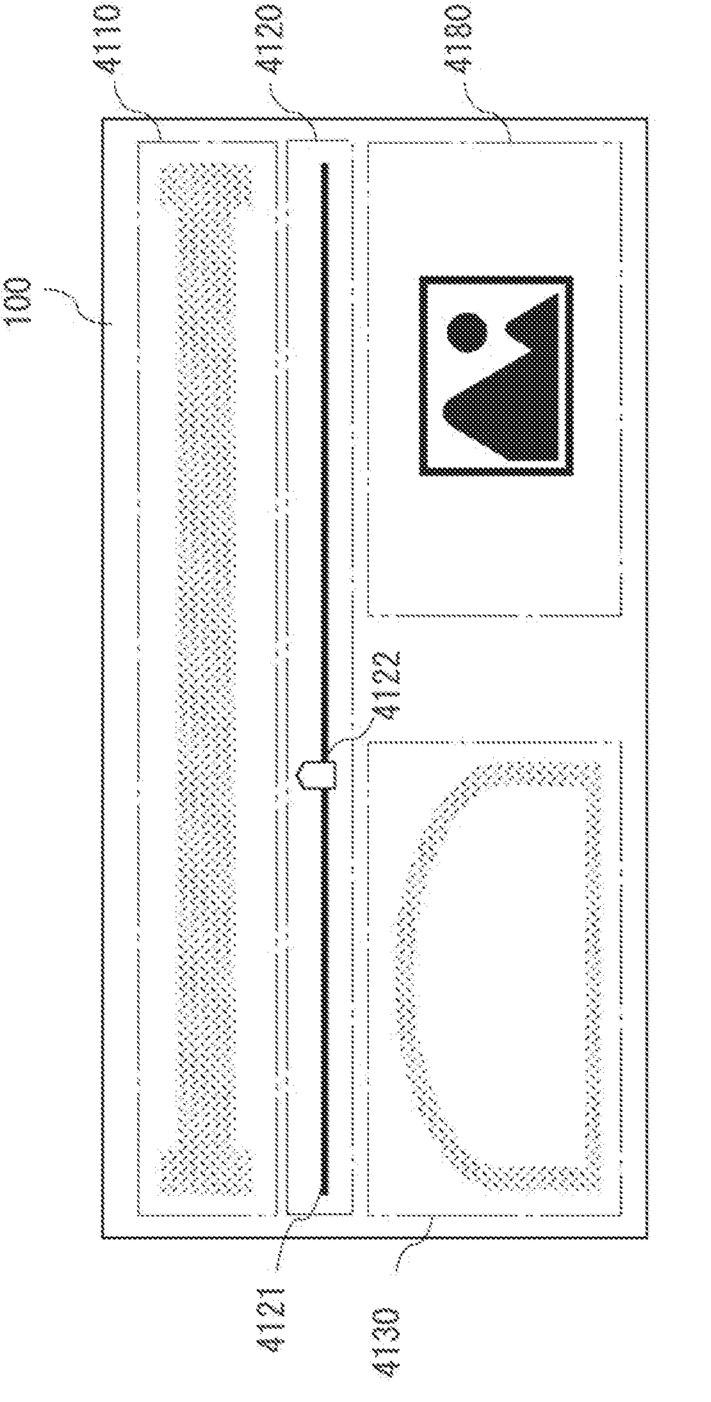
FIG. 10 is a diagram illustrating an example of a graphical user interface according to the third example embodiment.

FIG. 10 is a diagram illustrating an example of a graphical user interface according to the third example embodiment. The GUI can be used to display a point cloud image generated using the acquired three-dimensional data, and inspect or analyze an abnormal point. The GUI includes a global display region 4110, a one-dimensional position designation display region 4120, a local display region 4130, and a time-series data display region 4180. In the global display region 4110, a point cloud image generated using the measured three-dimensional data is displayed. In the point cloud image, the entire one-dimensional direction (x axis direction) is displayed such that both ends of the measurement target in the longitudinal direction of the water conduit are displayed. In the global display region 4110 of FIG. 10, the entire point cloud image of the water conduit 6 viewed from above is displayed.

The one-dimensional position designation display region 4120 displays a slider bar 4121 that has a length corresponding to both ends in the longitudinal direction (x axis direction) of the point cloud image displayed in the global display region 4110. A slider 4122 can be moved along the slider bar 4121 by a designation input of the user. In some example embodiments, the one-dimensional position designation display region may be displayed to overlap with the global display region.

The local display region 4130 generates and displays a detailed image of the three-dimensional data of the measurement target based on the designated one-dimensional position. As illustrated in FIG. 10, the detailed image displays at least a two-dimensional image (for example, a cross-sectional view of the y axis and the z axis in a designated position coordinate value) at a designated position (for example, the coordinate value of the x axis) corresponding to the one-dimensional direction in the three-dimensional data. In another example embodiment, a three-dimensional point cloud image (for example, a perspective point cloud image including the abnormal point) within a predetermined range (for example, a range of a positive or negative threshold of the designated position coordinate value) in the one-dimensional direction from a designated position corresponding to the one-dimensional direction in the three-dimensional data can be displayed.

In the time-series data display region 4180, an image captured by the camera 4 is displayed. It is possible to display time-series data including time stamp information that is the same as or approximate to the time stamp information corresponding to the position of the slider 4122 on the slider bar 4121 designated by the one-dimensional position designation unit 120. In some example embodiments in which the camera 4 can perform imaging in all directions (360 degrees) of the moving object 2, images displayed in the time-series data display region 4180 can be changed to images in various directions by a user operation.

Figure 11:
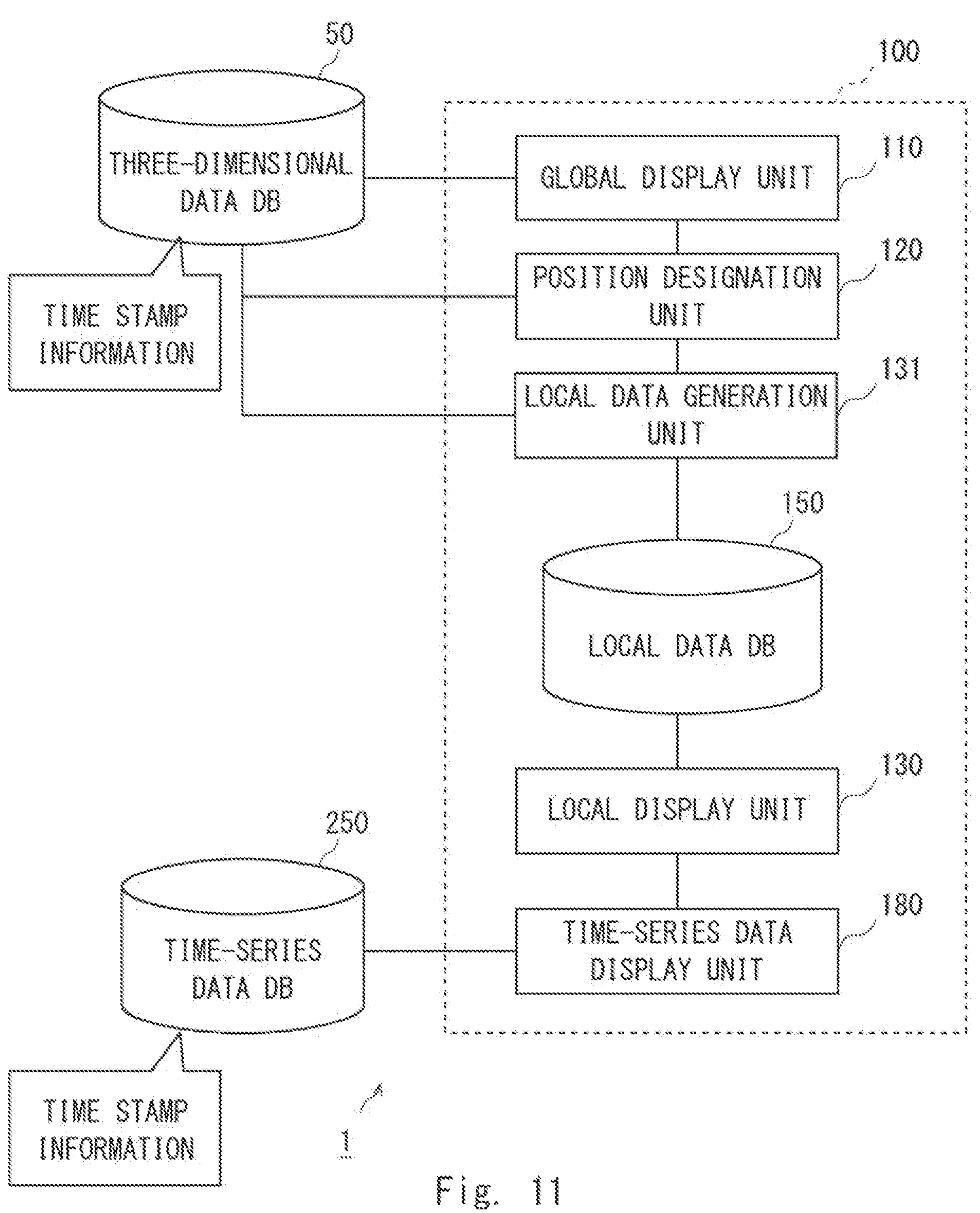
FIG. 11 is a block diagram illustrating a configuration of a display system according to the third example embodiment.

FIG. 11 is a block diagram illustrating a configuration of a display system according to the second example embodiment.

The display system 1 may include a three-dimensional data database 50, a display device 100, and a time-series data database 250. The display device 100 may include a global display unit 110, a position designation unit 120, a local data generation unit 131, a local data database 150, a local display unit 130, and a time-series data display unit 180.

The three-dimensional data database 50 stores the three-dimensional data acquired by the sensor by moving the moving object, as described above. The three-dimensional data database 50 may store raw measurement data that can include time stamp information and coordinate values on the x axis, the y axis, and the z axis at each measurement point, or a point cloud image generated based on the measurement data.

The global display unit 110 displays the generated point cloud image using the three-dimensional data including the three-dimensional coordinate values (coordinate values on the x-axis, the y-axis, and the z-axis) of the measurement target. As illustrated in FIG. 4, the global display unit 110 displays at least the entire one-dimensional direction (for example, in the x axis direction) of the generated point cloud image. The displayed point cloud image may be a two-dimensional image or a three-dimensional image. In some example embodiments, the display device 100 may include a global data generation unit that generates a point cloud image (global data) based on the raw measurement data that can include coordinate values on the x axis, the y axis, and the z axis at each measurement point.

The position designation unit 120 determines a scale based on the coordinate value range of the three-dimensional data or a display shape of the global display unit. The scale indicates a one-dimensional position (association) corresponding to the point cloud image displayed on the global display unit 110 based on, for example, the maximum value and the minimum value in the longitudinal direction in the three-dimensional data. In other words, the determination of the scale is to quantify the position of the slider bar to correspond to the point cloud image displayed on the global display unit 110. The position designation unit 120 designates a specific one-dimensional position (for example, a coordinate value on the x axis) in the three-dimensional data. The position designation unit 120 can receive a user input (for example, a designation of a cursor position by a mouse or a designation of a slider bar by a touch input to a touch panel) and designate a position corresponding to the longitudinal direction (for example, in the x axis direction) in the three-dimensional data.

The local data generation unit 131 generates a detailed image (local data) of the three-dimensional data based on the one-dimensional position designated by the position designation unit. The local data generation unit 131 can create local data (detailed image) using the three-dimensional data including the three-dimensional coordinate values (coordinate values on the x-axis, the y-axis, and the z-axis) of the measurement target and the designated one-dimensional position (for example, the coordinate value of the x axis).

The local data database 150 stores the local data (detailed image data) generated by the local data generation unit 131.

The local display unit 130 displays a detailed image of the three-dimensional data generated based on the one-dimensional position designated by the position designation unit. In some example embodiments, the local display unit 130 can display a three-dimensional point cloud image (for example, a perspective point cloud image including the abnormal point) of a predetermined range (for example, a range of a positive or negative threshold of the designated position coordinate value) in the one-dimensional direction from a designated position corresponding to the one-dimensional direction in the three-dimensional data. In another example embodiment, the local display unit 130 can display at least a two-dimensional image (for example, a cross-sectional view of the y axis and the z axis at a designated position coordinate value) at a designated position (for example, the coordinate value of the x axis) corresponding to the one-dimensional direction in the three-dimensional data.

The time-series data database 250 stores time-series data imaged by the camera 4 mounted on the moving object 2. The time-series data includes time stamp information including the time at which an image is captured by the camera 4. In some example embodiments, the display device 100 may include a time-series data database 250.

The time-series data display unit 180 reads time-series data having time stamp information that is the same as or approximate to the time stamp information of the image displayed on the local display unit 130, and displays the time-series data. The same or approximate time stamp information means that an acquisition time is the same or relatively close (for example, a time indicated by the time stamp information is within a range of a few seconds or a few milliseconds).

Figure 12:
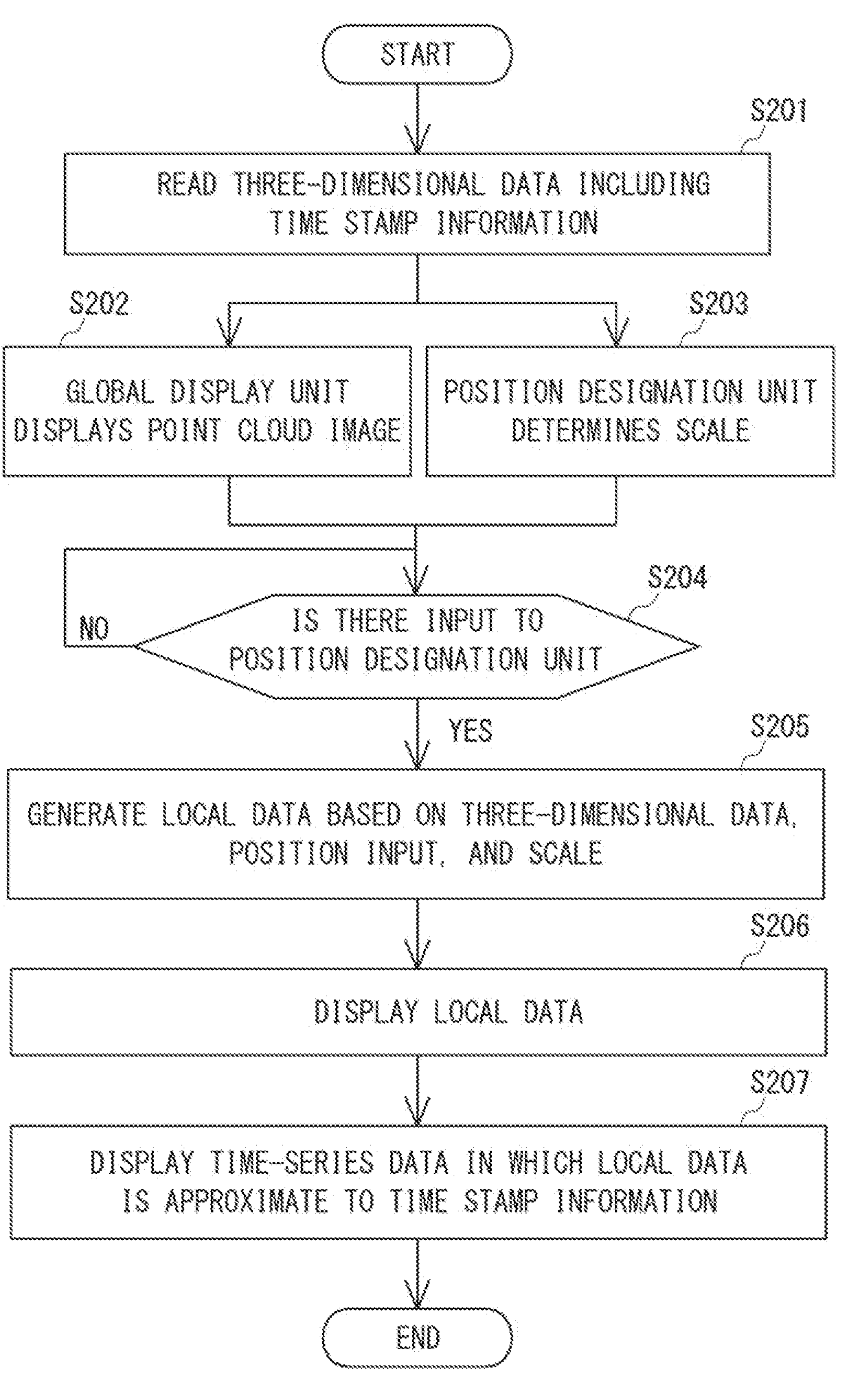
FIG. 12 is a flowchart illustrating a display method according to the third example embodiment.

FIG. 12 is a flowchart illustrating a display method according to the third example embodiment.

The display device 100 reads the three-dimensional data including the time stamp information from the three-dimensional data database 50 (step S201), and the global display unit 110, the position designation unit 120, and the local data generation unit 131 then receive the three-dimensional data. The global display unit 110 displays the point cloud image generated using the three-dimensional data (step S202). The position designation unit 120 determines a scale based on at least one of a coordinate value range (a maximum value and a minimum value) of the three-dimensional data, a display shape of the point cloud image displayed on the global display unit 110, a range of the time stamp information, and the like (step S203). Steps S202 and S203 may be performed simultaneously, or either step S202 or S203 may be performed first.

Further, the position designation unit 120 receives a user input and designates a one-dimensional position (for example, the position of the slider bar in FIG. 10) (step S204). The user can select a portion where the user desires to display details from the slider bar 4120 that can correspond to the image displayed in the global display region 4110.

The local data generation unit 131 generates local data (detailed image data) based on the three-dimensional data, the one-dimensional position designated by the user input, and the scale (step S205). The local display unit 130 displays the generated local data (detailed image data) (step S206). Further, the time-series data display unit 180 acquires the time-series data in which the displayed local data is the same as or approximate to the time stamp information from the time-series data database 250, and displays the time-series data (step S207). The program according to the present example embodiment is a program causing a computer to execute a display method as illustrated in FIG. 12.

According to the above-described third example embodiment, in addition to the global display and the local display according to the above-described example embodiments, it is possible to display a scene of the time-series data imaged by the camera, and thus, it is possible to provide the user with a GUI more appropriate for inspection, analysis, and the like of an abnormal point or the like.

Figure 13:
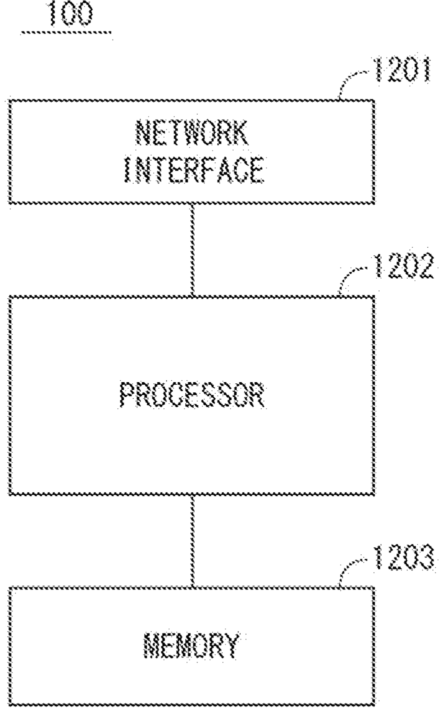
FIG. 13 is a block diagram illustrating a hardware configuration example of a display device or an information processing device according to some example embodiments.

FIG. 13 is a block diagram illustrating a hardware configuration example of the display device 100. Referring to FIG. 13, the display device 100 includes a network interface 1201, a processor 1202, and a memory 1203. The network interface 1201 is used to communicate with other network node devices that configure the communications system. The network interface 1201 may be used to perform wireless communication. For example, the network interface 1201 may be used to perform wireless LAN communication defined in IEEE 802.11 series or mobile communication defined in 3rd Generation Partnership Project (3GPP). Alternatively, the network interface 1201 may include, for example, a network interface card (NIC) in conformity with IEEE 802.3 series.

The processor 1202 performs the process of the display device 100 described with reference to the flowchart or sequence in the above-described example embodiment by reading and executing software (computer program) from the memory 1203. The processor 1202 may be, for example, a microprocessor, a micro processing unit (MPU), or a central processing unit (CPU). The processor 1202 may include a plurality of processors.

The memory 1203 is configured in a combination of a volatile memory and a nonvolatile memory. The memory 1203 may include a storage disposed away from the processor 1202. In this case, the processor 1202 may access the memory 1203 through an I/O interface (not illustrated).

In the example of FIG. 13, the memory 1203 is used to store a software module group. The processor 1202 can perform the process of the display device 100 described in the above-described example embodiment by reading and executing these software module groups from the memory 1203.

As described with reference to FIG. 13, each of the processors included in the display device 100 and the like executes one or a plurality of programs including a command group causing a computer to perform the algorithm described with reference to the drawings.

Other Example Embodiments

In the above-described example embodiments, the configuration of the hardware has been described, but the present invention is not limited thereto. According to the present disclosure, any process can also be implemented by causing a CPU to execute a computer program. The plurality of above-described examples can be implemented in combination as appropriate.

In the above-described example, the program can be stored using various types of non-transitory computer-readable media to be supplied to a computer. The non-transitory computer-readable media include various types of tangible storage media. Examples of the non-transitory computer-readable media include a magnetic recording medium (for example, a flexible disk, a magnetic tape, or a hard disk drive), a magneto-optical recording medium (for example, a magneto-optical disc), a CD-read only memory (ROM), a CD-R, a CD-R/W, a digital versatile disc (DVD), and semiconductor memories (for example, a mask ROM, a programmable ROM (PROM), an erasable PROM (EPROM), a flash ROM, and a random access memory (RAM)). The program may be supplied to the computer by various types of transitory computer-readable media. Examples of transitory computer-readable media include electrical signals, optical signals, and electromagnetic waves. The transitory computer-readable medium can provide the program to the computer via a wired communication line such as an electric wire and optical fibers or a wireless communication line.

The present disclosure is not limited to the above example embodiments, and can be appropriately changed without departing from the scope. The present disclosure may be implemented by appropriately combining the example embodiments.

Some or all of the above-described example embodiments may be described as the following supplementary notes, but are not limited to the followings.

Supplementary Note 1

A display device including:

a global display unit configured to display a point cloud image generated using three-dimensional data including three-dimensional coordinate values of a measurement target;

a position designation unit configured to designate a one-dimensional position in the three-dimensional data; and a local display unit configured to generate and display a detailed image of the three-dimensional data based on the one-dimensional position designated by the position designation unit.

Supplementary Note 2

The display device according to Supplementary Note 1, wherein the position designation unit designates a position corresponding to a longitudinal direction in the three-dimensional data.

Supplementary Note 3

The display device according to Supplementary Note 1 or 2, wherein the global display unit displays an entire generated three-dimensional image in at least a one-dimensional direction.

Supplementary Note 4

The display device according to any one of Supplementary Notes 1 to 3, wherein the local display unit displays a three-dimensional image within a predetermined range in a one-dimensional direction from a designated position corresponding to the one-dimensional direction in the three-dimensional data.

Supplementary Note 5

The display device according to any one of Supplementary Notes 1 to 3, wherein the local display unit displays at least a two-dimensional image at a designated position corresponding to a one-dimensional direction in the three-dimensional data.

Supplementary Note 6

The display device according to any one of Supplementary Notes 1 to 5, further including an abnormal point display unit configured to display an abnormal point of the measurement target to correspond to the one-dimensional position.

Supplementary Note 7

The display device according to any one of Supplementary Notes 1 to 6, wherein the three-dimensional data includes time stamp information indicating a measurement time of the measurement target, the one-dimensional position is a position that is convertible into the time stamp information, and the global display unit displays corresponding time stamp information based on a one-dimensional position designated by the position designation unit.

Supplementary Note 8

The display device according to any one of Supplementary Notes 1 to 7, wherein the three-dimensional data includes first time stamp information indicating a measurement time of the measurement target, the display device further includes a time-series data display unit configured to display time-series data that has second time stamp information indicating a photographing time, and based on the one-dimensional position designated by the position designation unit, the time-series data display unit displays time-series data that has the second time stamp information that is the same as or approximate to the first time stamp information of the detailed image displayed by the local display unit.

Supplementary Note 9

A display method including:

displaying a point cloud image generated using three-dimensional data including three-dimensional coordinate values of a measurement target;

designating a one-dimensional position in the three-dimensional data; and generating and displaying a detailed image of the three-dimensional data based on the designated one-dimensional position.

Supplementary Note 10

A non-transitory computer-readable medium storing a program causing a computer to perform:

a process of displaying a point cloud image generated using three-dimensional data including three-dimensional coordinate values of a measurement target;

a process of designating a one-dimensional position in the three-dimensional data; and a process of generating and displaying a detailed image of the three-dimensional data based on the designated one-dimensional position.

The present invention has been described with reference to the example embodiments (and examples). However, the present invention is not limited to the above-described example embodiments (and examples). Various modifications that can be understood by those skilled in the art can be made to the configuration and details of the present invention within the scope of the present invention.

REFERENCE SIGNS LIST

1 DISPLAY SYSTEM
2 MOVING OBJECT
4 CAMERA
5 SENSOR
6 MEASUREMENT TARGET
10 DISPLAY DEVICE
11 GLOBAL DISPLAY UNIT
12 POSITION DESIGNATION UNIT
13 LOCAL DISPLAY UNIT
50 THREE-DIMENSIONAL DATA DATABASE
100 DISPLAY DEVICE
110 GLOBAL DISPLAY UNIT
120 POSITION DESIGNATION UNIT
130 LOCAL DISPLAY UNIT
131 LOCAL DATA GENERATION UNIT
150 LOCAL DATA DATABASE
180 TIME-SERIES DATA DISPLAY UNIT
250 TIME-SERIES DATA DATABASE
1201 NETWORK INTERFACE
1202 PROCESSOR
1203 MEMORY
4110 GLOBAL DISPLAY REGION
4120 ONE-DIMENSIONAL POSITION DESIGNATION DISPLAY REGION
4130 LOCAL DISPLAY REGION
4180 TIME-SERIES DATA DISPLAY REGION

What is claimed is:

1. A display device comprising:

at least one memory storing instructions, and at least one processor configured to execute the instructions to;

generate a point cloud image using three-dimensional data including three-dimensional coordinate values of an elongated measurement target, display the generated point cloud image, and display an entire image of a one-dimensional direction corresponding to a longitudinal direction in the point cloud image;

designate a one-dimensional position corresponding to the longitudinal direction in the three-dimensional data; and generate and display a detailed image of the three-dimensional data based on the designated one-dimensional position.

2. The display device according to claim 1, wherein the at least one processor configured to execute the instructions to display a three-dimensional image within a predetermined range in the one-dimensional direction from the designated position corresponding to the one-dimensional direction in the three-dimensional data.

3. The display device according to claim 1, wherein the at least one processor configured to execute the instructions to display at least a two-dimensional image at the designated position corresponding to the one-dimensional direction in the three-dimensional data.

4. The display device according to claim 1, wherein the at least one processor configured to execute the instructions to display an abnormal point of the measurement target to correspond to the one-dimensional position.

5. The display device according to claim 1, wherein the three-dimensional data includes time stamp information indicating a measurement time of the measurement target, the one-dimensional position is a position that is convertible into the time stamp information, and the at least one processor configured to execute the instructions to display corresponding time stamp information based on a one-dimensional position designated.

6. The display device according to claim 1, wherein the three-dimensional data includes first time stamp information indicating a measurement time of the measurement target, the at least one processor configured to execute the instructions to display time-series data that has second time stamp information indicating a photographing time, and based on the one-dimensional position designated by the position designation unit, the at least one processor configured to execute the instructions to display time-series data that has the second time stamp information that is the same as the first time stamp information of the detailed image displayed.

7. The display device according to claim 1, wherein the elongated measurement target has an elongated shape of 50 m or more in length.

8. A display method comprising:

generating a point cloud image using three-dimensional data including three-dimensional coordinate values of an elongated measurement target, and displaying the generated point cloud image, and displaying an entire image of a one-dimensional direction corresponding to a longitudinal direction in the point cloud image;

designating a one-dimensional position corresponding to the longitudinal direction in the three-dimensional data; and generating and displaying a detailed image of the three-dimensional data based on the designated one-dimensional position.

9. A non-transitory computer-readable medium storing a program causing a computer to perform:

a process of generating a point cloud image using three-dimensional data including three-dimensional coordinate values of an elongated measurement target, displaying the generated point cloud image, and displaying an entire image of a one-dimensional direction corresponding to a longitudinal direction in the point cloud image;

a process of designating a one-dimensional position corresponding to the longitudinal direction in the three-dimensional data; and a process of generating and displaying a detailed image of the three-dimensional data based on the designated one-dimensional position.

* * * * *